United States Patent
Biswas

(10) Patent No.: US 10,922,229 B2
(45) Date of Patent: Feb. 16, 2021

(54) IN-MEMORY NORMALIZATION OF CACHED OBJECTS TO REDUCE CACHE MEMORY FOOTPRINT

(71) Applicant: Microsoft Technology Licensing, LLC, Redmond, WA (US)

(72) Inventor: Subrata Biswas, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 60 days.

(21) Appl. No.: 16/297,849

(22) Filed: Mar. 11, 2019

(65) Prior Publication Data

US 2020/0293446 A1 Sep. 17, 2020

(51) Int. Cl.
*G06F 12/084* (2016.01)
*G06F 12/0888* (2016.01)

(52) U.S. Cl.
CPC ........ *G06F 12/084* (2013.01); *G06F 12/0888* (2013.01); *G06F 2212/1044* (2013.01); *G06F 2212/608* (2013.01)

(58) Field of Classification Search
CPC .............. G06F 12/084; G06F 12/0888; G06F 2212/608; G06F 2212/1044; G06F 16/24552
See application file for complete search history.

(56) References Cited

U.S. PATENT DOCUMENTS

| | | | |
|---|---|---|---|
| 5,038,278 A | 8/1991 | Steely et al. | |
| 6,421,683 B1 | 7/2002 | Lamburt | |
| 6,732,237 B1 | 5/2004 | Jacobs et al. | |
| 6,928,466 B1 | 8/2005 | Buika et al. | |
| 7,383,285 B1* | 6/2008 | Pal | G06F 16/289 |
| 7,529,728 B2 | 5/2009 | Weissman et al. | |
| 7,624,126 B2 | 11/2009 | Pizzo et al. | |
| 8,095,618 B2 | 1/2012 | Lewis et al. | |
| 2003/0115194 A1* | 6/2003 | Pitts | G06F 16/24542 |
| 2003/0200197 A1 | 10/2003 | Long et al. | |
| 2005/0223022 A1 | 10/2005 | Weissman et al. | |
| 2006/0053164 A1* | 3/2006 | Ewing | H04L 67/125 |
| 2006/0235831 A1 | 10/2006 | Adinolfi et al. | |

(Continued)

FOREIGN PATENT DOCUMENTS

| | | |
|---|---|---|
| EP | 1187040 A2 | 3/2002 |
| JP | 2004516532 A | 6/2004 |

(Continued)

OTHER PUBLICATIONS

"Office Action Issued in Indian Patent Application No. 05383/CHENP/2009", dated Feb. 27, 2017, 7 Pages.

(Continued)

*Primary Examiner* — Larry T Mackall
(74) *Attorney, Agent, or Firm* — Christopher J. Volkmann; Kelly, Holt & Christenson, PLLC

(57) ABSTRACT

Database objects are retrieved from a database and parsed into normalized cached data objects. The database objects are stored in the normalized cached data objects in a cache store, and tenant data requests are serviced from the normalized cached data objects. The normalized cached data objects include references to shared objects in a shared object pool that can be shared across different rows of the normalized cached data objects and across different tenant cache systems.

20 Claims, 12 Drawing Sheets

(56) References Cited

U.S. PATENT DOCUMENTS

| | | | |
|---|---|---|---|
| 2007/0130130 | A1 | 6/2007 | Chan et al. |
| 2007/0130137 | A1 | 6/2007 | Oliver et al. |
| 2007/0156842 | A1 | 7/2007 | Vermeulen et al. |
| 2007/0266113 | A1 | 11/2007 | Koopmans et al. |
| 2008/0222191 | A1 | 9/2008 | Yoshida et al. |
| 2013/0138891 | A1* | 5/2013 | Chockler .............. G06F 12/121 711/133 |
| 2017/0330151 | A1* | 11/2017 | Schikora .............. G06Q 10/103 |
| 2018/0300242 | A1 | 10/2018 | Liu et al. |

FOREIGN PATENT DOCUMENTS

| | | | |
|---|---|---|---|
| JP | 2007531941 | T | 11/2007 |
| KR | 1019960002006 | A | 1/1996 |
| RU | 2272316 | C2 | 3/2006 |
| WO | 2006037613 | A2 | 4/2006 |
| WO | 2008121540 | A1 | 10/2008 |

OTHER PUBLICATIONS

"European Search Report Issued in European Patent Application No. 08732318.4", dated Jul. 26, 2012, 7 Pages.

"International Search Report and Written Opinion Issued in PCT Application No. PCT/US2008/57173", dated Aug. 22, 2008, 10 Pages.

"Office Action Issued in European Patent Application No. 08732318.4", dated Sep. 21, 2016, 5 Pages.

"First Office Action Issued in Korean Patent Application No. 102009719871", dated Jun. 27, 2014, 4 Pages.

"First Office Action Issued in Japanese Patent Application No. 2010-502182", dated Oct. 12, 2012, 4 Pages.

"Final Office Action issued in U.S. Appl. No. 11/731,564", dated Nov. 8, 2010, 16 Pages.

"Non Final Office Action Issued in U.S. Appl. No. 11/731,564", dated Apr. 28, 2010, 11 Pages.

Enoki, Ryuji, "The Latest Technology Making Companies Hot, SaaS", Published by Nikkei Business Publications Inc., No. 479, Feb. 1, 2007, pp. 102-107.

"First Office Action Issued in Chinese Patent Application No. 200880010778.3", dated Mar. 30, 2012, 7 Pages.

Chong, et al., "Multi-Tenant Data Architecture Microsoft Corporation", Retrieved from http://ramblingsofraju.com/wp-content/uploads/2016/08/Multi-Tenant-Data-Architecture.pdf. Jun. 2006, 16 Pages.

"Second Office Action Issued in Chinese Patent Application No. 20088010778.3", dated Dec. 31, 2012, 6 Pages.

"Notice of Allowance Issued in Russian Patent Application No. 2009136171", dated Feb. 14, 2012, 16 Pages.

"Notice of Allowance Issued in Japanese Patent Application No. 2010-502182", dated Feb. 12, 2013, 6 Pages.

"International Search Report and Written Opinion Issued in PCT Application No. PCT/US2020/015522", dated May 27, 2020, 10 Pages.

* cited by examiner

| RowVersion | AttributeID | EntityId | Column | Name | PhysicalName | IsValidForCreate | IsValidForRead |
|---|---|---|---|---|---|---|---|
| 1000 | GUID_1 | Entity1_Id | 1 | "abc" | "Abc" | 1 | 1 |
| 1001 | GUID_2 | Entity1_Id | 2 | "xyz" | "Xyz" | 1 | 1 |
| 1002 | GUID_3 | Entity1_Id | 3 | "pqr" | "Pqr" | 1 | 1 |
| 1003 | GUID_4 | Entity2_Id | 1 | "abc" | "Abc" | 1 | 1 |
| 1004 | GUID_5 | Entity2_Id | 2 | "xyz" | "Xyz" | 1 | 1 |
| 1005 | GUID_6 | Entity2_Id | 3 | "pqr" | "Pqr" | 1 | 1 |
| 1006 | GUID_7 | Entity3_Id | 1 | "abc" | "Abc" | 1 | 1 |
| 1007 | GUID_8 | Entity3_Id | 2 | "xyz" | "Xyz" | 1 | 1 |
| 1008 | GUID_9 | Entity3_Id | 3 | "pqr" | "Pqr" | 1 | 1 |
| 1009 | GUID_10 | Entity4_Id | 1 | "abc" | "Abc" | 1 | 1 |
| 1010 | GUID_11 | Entity4_Id | 2 | "xyz" | "Xyz" | 1 | 1 |

FIG. 2

| Pointer | Name | PhysicalName | IsValidForCreate | IsValidForRead |
|---|---|---|---|---|
| IncrRowRef1 | "abc" | "Abc" | 1 | 1 |
| IncrRowRef2 | "xyz" | "Xyz" | 1 | 1 |
| IncrRowRef3 | "par" | "Par" | 1 | 1 |

FIG. 8

IN-MEMORY NORMALIZATION OF CACHED OBJECTS TO REDUCE CACHE MEMORY FOOTPRINT

BACKGROUND

Computing systems are currently in wide use. Some computing systems are multi-tenant systems that host services for multiple different tenants or organizations.

In such computing systems, the tenants often access data that is stored in one or more different data stores. In order to improve the performance of the service, tables from the data stores or databases are often cached into in-memory data structures. The data stored in the database or data stores may not be arranged according to an optimized schema. This may be done in order to decrease the query complexity that is needed to access data, and/or in order to improve performance of the database or data store.

This can mean that there are redundancies in the database or data store in terms of the database objects that are stored there.

SUMMARY

Database objects are retrieved from a database and parsed into normalized cached data objects. The database objects are stored in the normalized cached data objects in a cache store, and tenant data requests are serviced from the normalized cached data objects. The normalized cached data objects include references to shared objects in a shared object pool that can be shared across different rows of the normalized cached data objects and across different tenant cache systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2 shows one example of a conventional database table (in simplified form).

FIG. 8 shows one example of an inter-row sharable object.

DETAILED DESCRIPTION OF ILLUSTRATIVE EMBODIMENTS

Figure 1:
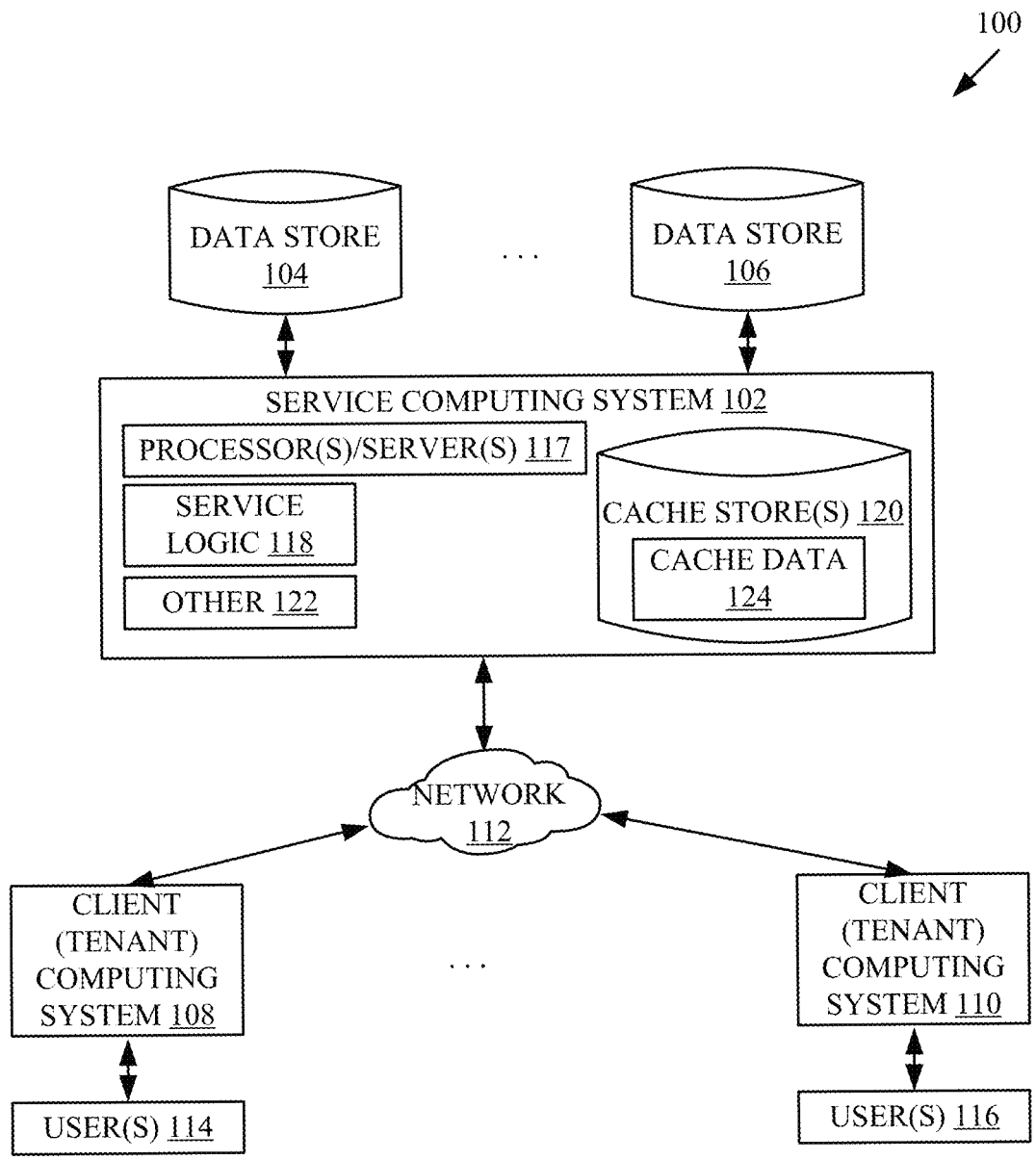
FIG. 1 is a block diagram of one example of a computing system architecture.

FIG. 1 is a block diagram showing one example of a computing system architecture 100. Architecture 100 shows that a service computing system 102 has access to a set of data stores 104-106 (which may be in service computing system 102, or located elsewhere) and that it illustratively hosts a service that can be accessed by client (or tenant) computing systems 108-110 over a network 112. Users 114, of client (or tenant) computing system 108 can illustratively access data on data stores 104-106 through the service hosted by service computing system 102, over network 112. Similarly, users 116 of client (or tenant) computing system 110 can also access data stored in data stores 104-106 using the service hosted by service computing system 102, over network 112. Therefore, network 112 can be any of a wide variety of different types of networks. It can be a wide area network, a local area network, a near field communication system, a cellular communication network, or any of a wide variety of other networks or combinations of networks.

In the example shown in FIG. 1, service computing system 102 illustratively includes processors or servers 117, service logic 118, one or more cache stores 120, and it can include a wide variety of other items 122. Service logic 118 may have a front end that receives data requests, from client computing system 108-110 which request access to various items of data in data stores 104-106. In servicing those requests, service logic 118 may include backend logic that retrieves and stores the requested data as cached data 124, in cache store 120. This can be done to improve the performance of the service in responding to subsequent data requests, from various different client computing systems 108-110, for the same data.

By way of example, cached data 124 in cache store 120 may include database tables from data stores 104-106 that are stored as in-memory data structures. In this way, the data can be more quickly accessed (from cache store 120) in response to requests from client computing systems 108-110. Thus, it can thus be seen that any cached data 124 that is stored in cache store 120 increases the memory footprint of the service (or process), being hosted by service computing system 102, that uses that data.

Also, the database schema that is used for storing data in data stores 104-106 may not be normalized or optimized. Thus, there may be redundancy among the various different data objects stored in data stores 104-106. This may be done in order to reduce the query complexity of queries directed against data stores 104-106 and in order to improve the performance of the databases (or data stores) 104-106 in responding to queries.

In many current systems, however, service logic 118 directly copies the database tables to the cache, as cached data 124 in cache store 120. The in-memory cached copy (e.g., cache data 124) of the database objects thus, in many current systems, also includes the same redundancies that are found in data stores 104-106. Depending upon the level of redundancy, this can greatly increase the memory footprint of the service (or process) hosted by the service computing system 102.

While it may be undesirable to modify the database schema used by data stores 104-106, the service logic 118 in accordance with one example described herein reduces the memory footprint of the service (or process), without modifying the database schema or any upstream application contracts that are to be upheld with various applications or services that are accessing that data. Instead, service logic 118 illustratively normalizes the in-memory data structures (cached data 124) and shares normalized objects with different in-memory cache objects. A memory loading system (described in more detail below) parses database structures (e.g., tables) retrieved from data stores 104-106 into a set of normalized objects. The normalized objects include objects that are shared, on an inter-row basis, with other objects in the cached data 124. It also includes data that is shared among different tenants. In this way, when a client computing system 108-110 requests access to cached data, the data can be quickly retrieved in a way that is invisible to the client computing systems 108-110, because it is stored in-memory, as cached data 124. However, because it is stored in data structures that are normalized, and shared, the memory footprint corresponding to the service (or process) is greatly reduced.

To further illustrate this, FIG. 2 shows one example of a simplified version of a conventional database table. The strongly typed class corresponding to that table (and referred to as the AttributeMetadata class) is represented in Table 1 below:

TABLE 1

```
class AttributeMetadata
{
    long RowVersion;
    Guid AttributeId;
    Guid EntityId;
    Int ColumnNumber;
    String Name;
    String Physic alName;
    Bool IsValidForCreate;
    Bool IsValidForRead;
}
```

It can be seen in FIG. 2 that there is a relatively high degree of redundancy in the database table. Since, in current systems, there is a one-to-one mapping between the database schema used to generate the database tables (such as that shown in FIG. 2) and the in-memory objects stored as cached data 124, the same amount of redundancy is found, using current systems, in cached data 124.

Figure 3:
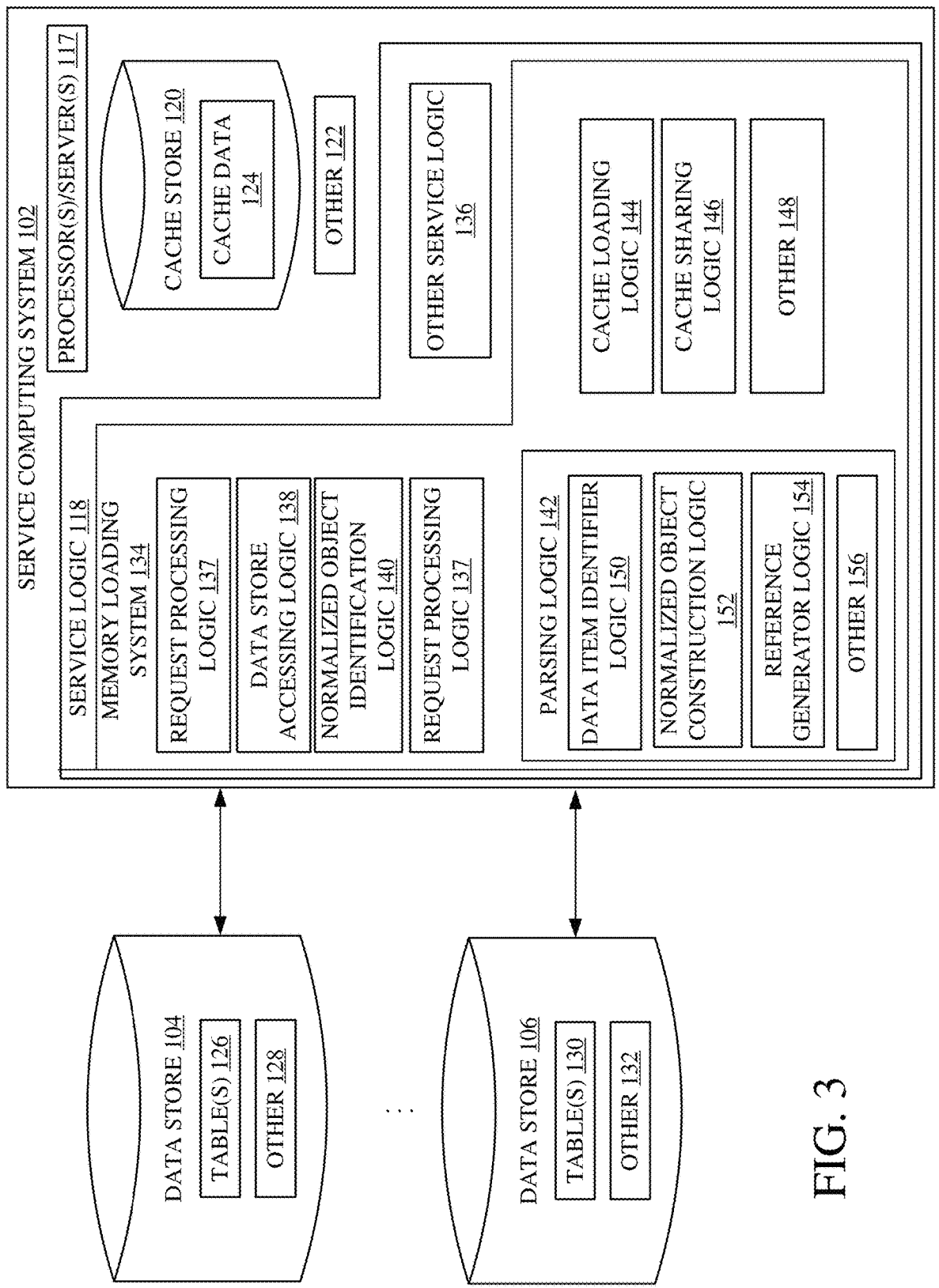
FIG. 3 is a block diagram showing one example of a service computing system, in more detail.

FIG. 3 is a block diagram showing some portions of service computing system 102, and data stores 104-106, in more detail. Some items are similar to those shown in FIG. 1, and they are similarly, numbered. In the example shown in FIG. 3, data store 104 illustratively includes a set of tables 126, and it can include a wide variety of other data 128. Similarly, data store 106 illustratively includes a set of tables 130, and it can include a wide variety of other items 132. FIG. 3 also shows that, in one example, service logic 118 can include memory loading system 134 and a wide variety of other service logic 136. Memory loading system 134, itself, illustratively includes data store accessing logic 138, normalized object identification logic 140, parsing logic 142, cache loading logic 144, cache sharing logic 146, and it can include a wide variety of other items 148.

Parsing logic 142, itself, illustratively includes data item identifier logic 150, normalized object construction logic 152, reference generator logic 154, and it can include other items 156. Before describing the overall operation of memory loading system 134, in more detail, a brief description of some of the items in system 134, and their operation, will first be provided.

Request processing logic 137 can receive a data access request from one of client (or tenant) computing systems 108-110. It processes that request to identify the data for which access is being requested. Assuming that that data has not already been loaded into cache 120, it identifies the particular data to be accessed and provides an indication of that to data store accessing logic 138. Data store accessing logic 138 then interacts with the particular data store 104-106 in order to access the data being requested. For instance, the data access request may access data in one or more different tables 126-130. Thus, data store accessing logic 138 obtains access to those requested tables.

Normalized object identification logic 140 employs a normalization strategy to identify any particular normalized objects that are to be created and into which the tables are to be stored in cache store 120. The particular normalized objects identified by normalized object identification logic 140 may be any of a wide variety of different types of normalized objects, and they may vary on a case-by-case basis. Further, the sets of normalized objects may be pre-defined, or they may be identified on-the-fly, as data requests are received. In addition, the sets of normalized objects that are created for any given table or set of tables (or other data structure) retrieved from databases 104-106 may be dynamic in that they change over time, based on machine learning techniques or based on other criteria. Thus, logic 140 can be logic that accesses a predefined set of objects using a lookup table or otherwise. It can be a pre-defined algorithm that identifies the set of normalized objects based on the data requested, or other criteria, or it can be a machine learned dynamic model that identifies the set of normalized objects dynamically using a neural network or in other ways.

Once the set of normalized objects have been identified, parsing logic 142 parses the retrieved tables into those normalized objects. Data item identifier logic 150 identifies the different data items in the retrieved tables. Normalized object construction logic 152 identifies whether a normalized object has already been constructed for this data item. If so, reference generator logic 154 generates a reference to the already constructed normalized object. If not, normalized object construction logic 152 constructs a normalized object for this data item.

Cache loading logic 144 loads the normalized objects (and/or the references) into the cache store 120 as cached data 124. Cache sharing logic 146 then shares the cached data 124 (the sharable data stored in normalized objects) among the different normalized objects that reference sharable data objects. In this way, the cached data 124 can be used to respond to data access requests from tenant computing systems 108-110, using shared data, without the client computing systems 108-110 even knowing that the data is shared among the different normalized objects in cache.

Figure 4:
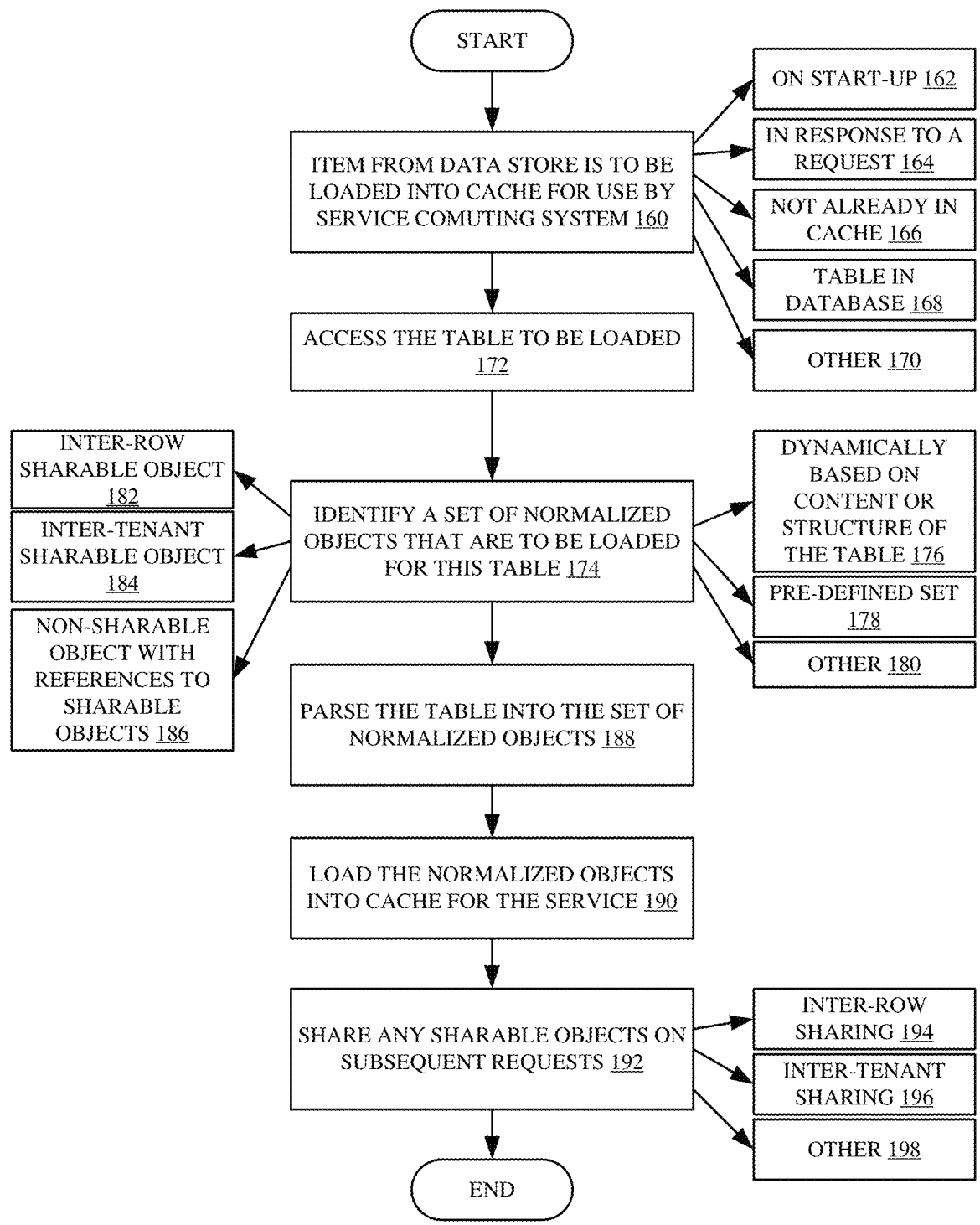
FIG. 4 is a flow diagram illustrating one example of the operation of the service computing system, in more detail.

FIG. 4 is a flow diagram showing one example of the operation of memory loading system 134, in more detail. It is first determined by memory loading system 134 that an item from at least one of the data stores 104-106 is to be loaded into cache store 120 for use by service computing system 102. This is indicated by block 160 in the flow diagram of FIG. 4. In one example, one or more data items (such as tables) can be loaded into cache store 120 upon startup of the service or a process in the service. This is indicated by block 162. In another example, the items (e.g., tables) can be loaded into cache store 120 in response to a data access request from a client computing system 108-110. This is indicated by block 164.

It is assumed at block 160 that the data is not already represented in cache store 120. This is indicated by block 166. It is also assumed, for the sake of the present discussion, that the data to be loaded from data stores 104-106 into cache store 120 is represented as tables 126-130 in the data stores. This is indicated by block 168. It will be appreciated, however, that it could be represented in other data structures as well. Identifying that an item from one of the data stores is to be loaded into cache 120 can be done in other ways as well. This is indicated by block 170.

Request processing logic 137 identifies the particular table or tables to be loaded and indicates this to data store accessing logic 138. Logic 138 interacts with the appropriate data stores 104-106 to access the tables to be loaded into cache 120. Accessing the tables is indicated by block 172 in the flow diagram of FIG. 4.

Normalized object identification logic 140 then identifies a set of normalized objects that are to be loaded into cache 120, as cached data 124, to represent the tables that are being accessed. This is indicated by block 174. As discussed above, the particular set of normalized objects can be identified dynamically based upon the content or structure of the tables or other data items being accessed. This is indicated by block 176 and it can be done using machine learning techniques, using a dynamic object identification model, or in other ways. In another example, the set of normalized objects that are to be generated in cache store 120, to represent the tables being accessed, may be a pre-defined set of objects. This is indicated by block 178. The set of objects can be identified in other ways as well, and this is indicated by block 180.

For purposes of the present description, it will be assumed that the set of normalized objects include an object that has non-sharable properties or data and sharable objects that have sharable properties or data. It will also be assumed that the sharable objects can be broken into a set of objects that includes inter-row sharable object 182, and inter-tenant sharable object 184. The non-sharable object is indicated by 186. The inter-row sharable object 182 includes data that is sharable across rows of a data table. Inter-tenant sharable object 184 includes data that is sharable across tenants for a particular table, and non-sharable object 186 includes data that is not sharable across rows or tenants.

Parsing logic 142 then parses the table being accessed into the set of normalized objects. This is indicated by block 188 in the flow diagram of FIG. 4. For instance, data item identifier logic 150 identifies an item of data that is to be parsed, such as a row or a combination of rows and columns. Normalized object construction logic 152 determines whether there is already a normalized object that has been constructed for this data item, and which can be referred to (e.g., that contains shared data for this data item). If so, then reference generator logic 154 generates a reference to that shared object. If not, however, then normalized object construction logic 152 constructs a normalized object that will contain the data for this data item.

Cache loading logic 144 then loads the normalized objects (the newly constructed objects and references to existing objects) into cache store 120, as cached data 124. This is indicated by block 190. The cached data 124 can then be used by the service. Where shared data (or sharable objects) have been generated and stored in cache data 124, cache sharing logic 146 manages the sharing of any sharable objects in response to subsequent data access requests. This is indicated by block 192. Again, the sharing can be inter-row sharing as indicated by block 194. It can be inter-tenant sharing as indicated by block 196, or it can be sharing in other ways, as indicated by block 198.

Figure 5:
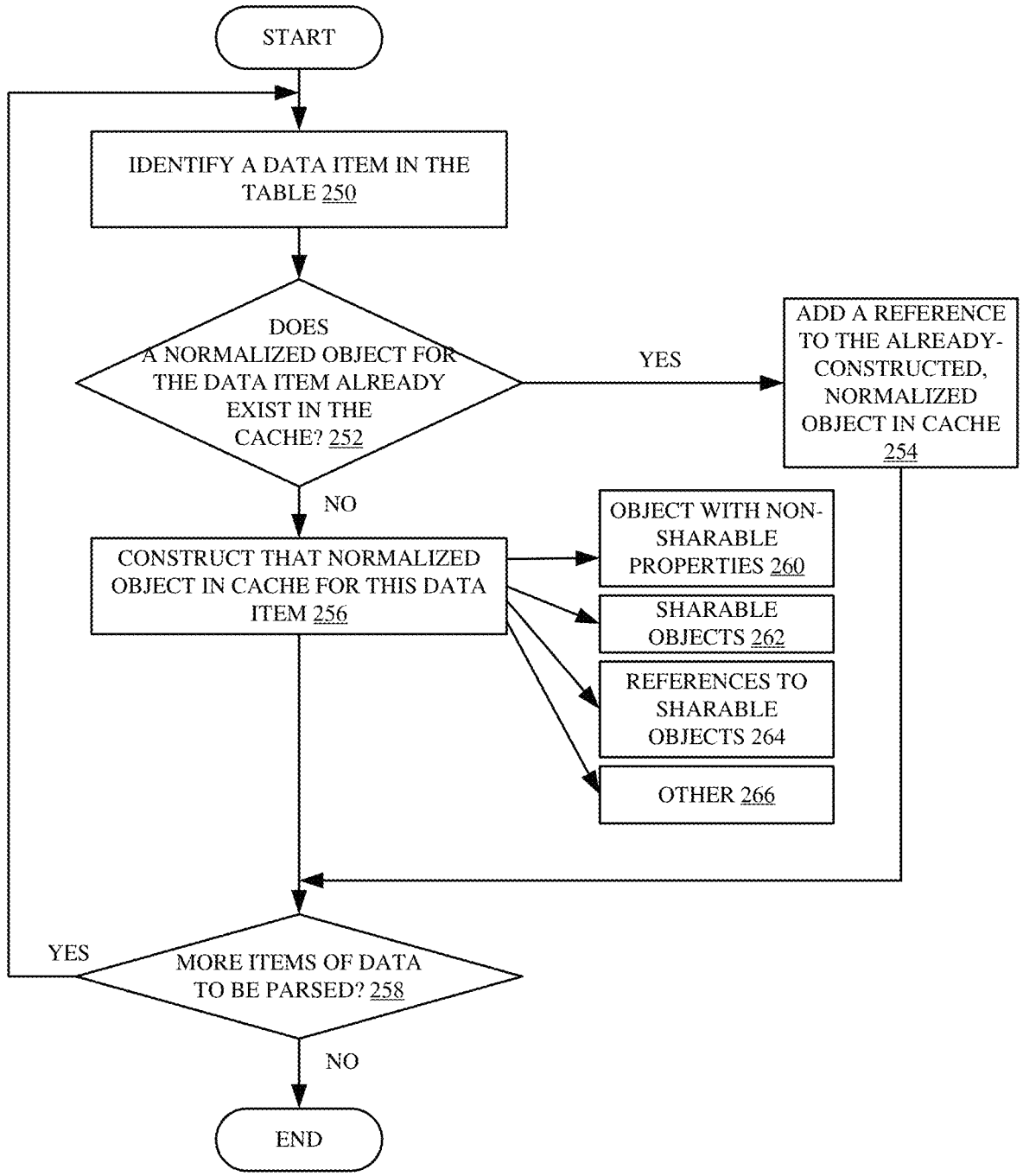
FIG. 5 is a flow diagram illustrating one example of the operation of a memory loading system.
Figure 6:
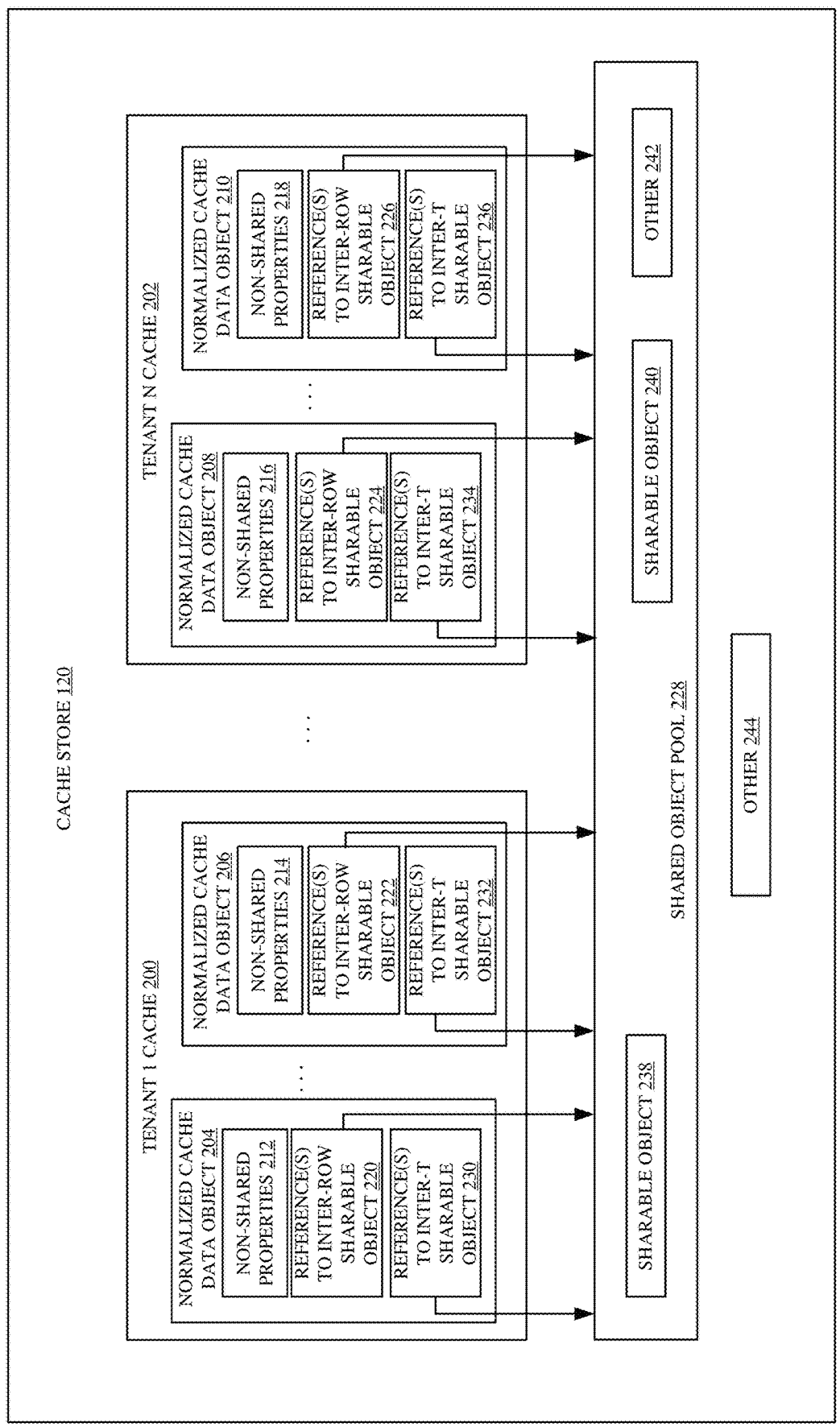
FIG. 6 is a block diagram showing one example of a cache store, in more detail.

Before describing the sharing process in more detail, a more detailed description of how a data item (such as a table) is parsed into the set of normalized objects, will first be provided. FIG. 5 is a flow diagram showing one example of this. FIG. 6 is a block diagram showing one example of cache store 120, in more detail. FIGS. 5 and 6 will now be described in conjunction with one another.

Cached data 124, in the example shown in FIG. 6, includes a cache for each of a plurality of different tenants. Those include Tenant 1 cache 200 through Tenant N cache 202. Each tenant cache 200-202 includes a set of normalized cache data objects. Cache 200 includes normalized cached data objects 204-206, while Tenant N cache 202 includes normalized cached data objects 208-210. Each set of normalized objects includes a set of non-shared properties 212, 214, 216 and 218, respectively. It also illustratively includes a set of references 220, 222, 224 and 226, respectively, to inter-row sharable objects that are stored in a shared objects pool 228. The references 220-226 point to a shared object in shared objects pool 228 that contains data that can be shared across rows of a table, for instance. Each of the normalized cached data objects 204-210 also illustratively includes a reference 230, 232, 234 and 236, respectively, to a shared object in shared objects pool 228 that includes data that can be shared across tenants.

Thus, the shared objects pool 228 illustratively includes a set of shared objects 238-240. It can include other items 242 as well. The shared objects 238-240 include data that can be shared across rows, and across different tenants. Thus, the normalized cached data objects 204-210 include, within themselves, the non-shared properties which can't be identified by referring to a shared object 238-240. Each of the normalized cached data objects 204-210 also include references to shared objects where the data can be obtained from a shared object 238-240 in shared objects pool 228. The references shown in FIG. 6 are, as discussed above, specifically references 220-226 to inter-row sharable objects which contain data that is shared across rows and references 230-236 to inter-tenant sharable objects that include data shared across tenants.

FIG. 5 is a flow diagram illustrating how parsing logic 142 illustratively generates the cache structure illustrated in FIG. 6. Data item identifier logic 150 first identifies a data item in the table. This is indicated by block 250 in the flow diagram of FIG. 5. For example, it may be that the data item is a row or a column in the table. It may be that it is a set of rows or columns, or another data item.

Normalized object construction logic 152 then determines whether a normalized object 204-210 already exists in cache store 120, for the item under analysis. This is indicated by block 252. For instance, it may be that the data item was already retrieved or accessed and was already parsed so that a normalized object already exists for it. Alternatively, it may not have recently been accessed, so that no normalized object yet exists in cache store 120 for the data item. If a normalized object (or a sharable object) already exists for the data item, then reference generator logic 154 adds a reference to that already constructed, sharable object in cache 120. This is indicated by block 254. However, if no normalized object has yet been created in cache 120, for this data item, then normalized object construction logic 152 constructs the normalized object (and where possible, a sharable object) in cache 120. This is indicated by block 256. Processing continues until there are no more data items to be parsed. This is indicated by block 258.

Constructing a normalized object in cache 120 can include identifying non-sharable properties, as indicated by block 260, and constructing sharable objects in the shared objects pool 228, as indicated by block 262. It also illustratively includes generating references to sharable objects in the shared objects pool 228, where that is possible. This is indicated by block 264. The normalized object can be constructed in other ways as well, and this is indicated by block 266.

At this point, a more specific example may be helpful. Assume, for the sake of example, that the data table shown and described above with respect to FIG. 2 is the data table being parsed.

Figure 7:
FIG. 7 shows one example of a normalized object.

FIG. 7 shows one example of a normalized object 270 that can be generated for the table shown in FIG. 2. It can be seen that normalized object 270 includes a column of non-sharable properties 272, a column of references 274 to inter-tenant sharable objects, and a column of references 276 to inter-row sharable objects. Non-sharable properties 272 can include such things as a unique identifier that is not shared across rows or tenants. The references 274 to the inter-tenant sharable objects can include references to sharable objects in the shared objects pool 228 where the objects referred to share properties that can be shared across tenants. This can include a wide variety of different things, such as an attribute name, or any other information that may be shared by different tenants. The references 276 to inter-row sharable objects also illustratively includes references to sharable objects in the shared objects pool 228. Those shared objects will illustratively share data that can be shared across multiple different rows in a table. This can also include a wide variety of different types of information. As examples, it may include such things as the data type (e.g., where multiple tables have the same data type) or other common metadata that is common across multiple rows.

FIG. 8 shows one example of a set of inter-row sharable objects 278. It can be seen that the inter-row sharable objects have a pointer 280 that is the same as the reference 276 to that object in FIG. 7. The shared properties include name 282, physical name 284, and Boolean properties 286 and 288. Thus, instead of having the object shown in FIG. 7 repeat all of that information, the inter-row references 276 simply refer to the shared properties in object 278. This greatly reduces redundancy.

Figure 9:
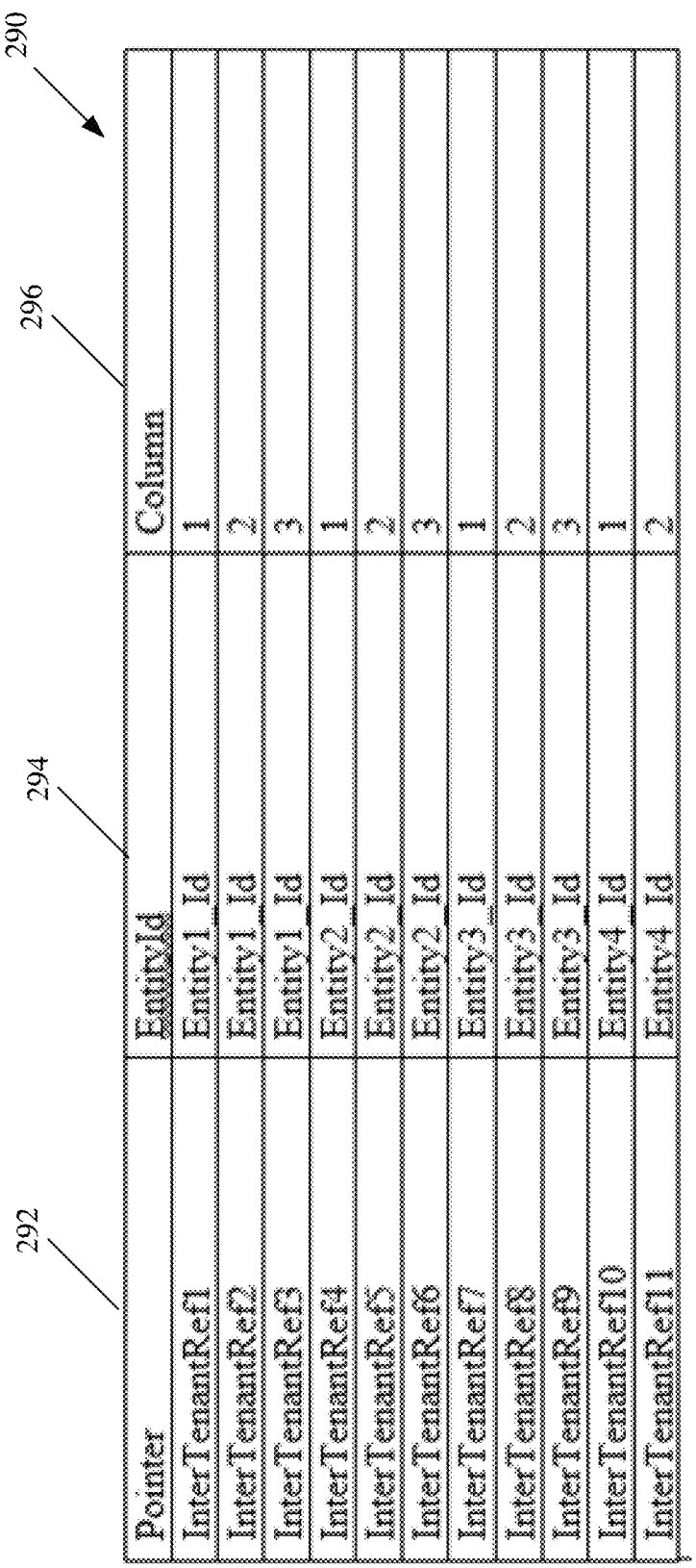
FIG. 9 shows one example of an inter-tenant sharable object.

FIG. 9 is similar to FIG. 8, except that it includes a set of sharable objects 290 that share the inter-tenant sharable properties. Object 290 includes a pointer 292 that is the same as the reference 274 to that object found in FIG. 7. The shared properties include the entity ID 294 and a column identifier 296. Again, instead of duplicating this information in the object shown in FIG. 7, a simple reference is inserted that identifies the sharable object in FIG. 9 that contains that information. Again, this greatly reduces redundancy in cache store 120.

Table 2 shows one example of how the classes may look, for the objects shown above in FIGS. 7-9:

TABLE 2

```
Class InterRowShrableProperties
{
   String Name;
   String PhysicalName;
   String InValidForRead;
   String IsValidForCreate;
}
Class InertTenantSharableProperties
{
   Guid EntityId;
   Guid ColumnNumber;
}
// We can skip creating this class during implementation.
Class NonSharableProperties
{
   Int RowVersion;
   Guid AttribtueId;
}
// AttributeMetadata contracts has not been altered.
class AttributeMetadata
{
   NonSharableProperties _nonSharableProperties;
   InterRowShrableProperties _interRowShrableProperties;
   InertTenantSharableProperties _inertTenantSharableProperties;
   long Row Version => _nonSharableProperties.RowVersion;
   Guid AttributeId => _nonSharableProperties.AttributeId;
   Guid EntityId => _ inertTenantSharableProperties.EntityId;
   Int ColumnNumber => _ inertTenantSharableProperties.ColumnNumber;
   String Name => _ interRowShrableProperties.Name;
   String PhysicalName => _ interRowShrableProperties. PhysicalName;
      Bool     IsValidForCreate     =>      _       interRowShrableProperties.
IsValidForCreate;
      Bool IsValidForRead => _ interRowShrableProperties. IsValidForRead;
   }
```

Figure 10:
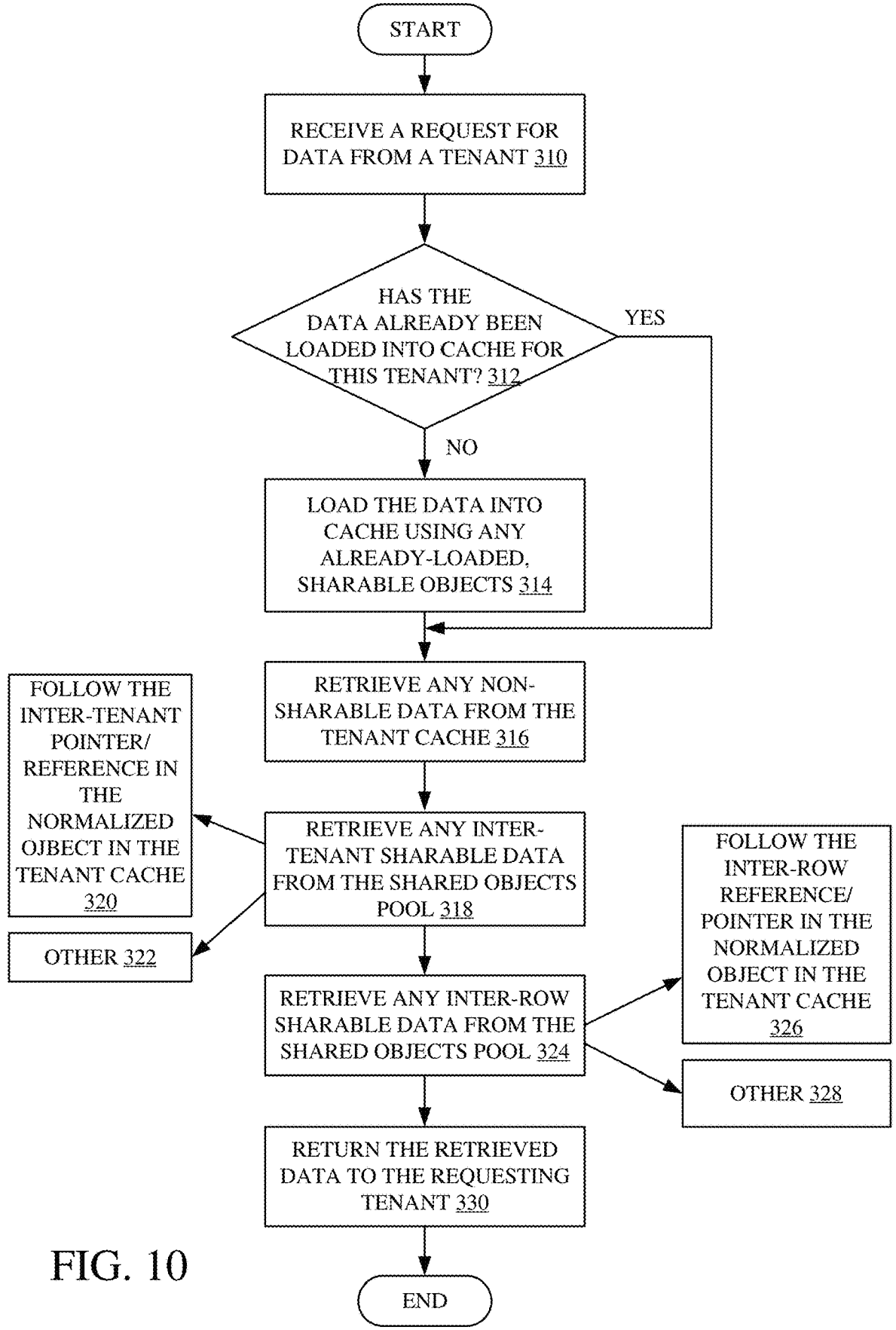
FIG. 10 is a flow diagram showing one example of the operation of cache sharing logic.

FIG. 10 is a flow diagram illustrating one example of the operation of cache sharing logic 146 in sharing the sharable objects in shared objects pool 228 with the caches for various tenants, in a multi-tenant scenario. Service logic 118, and particular request processing logic 137, first receives a data access request from a client computing system 108-110. This is indicated by block 310 in the flow diagram of FIG. 10. Data store accessing logic 138 then determines whether the data has already been loaded into cache store 120 for this tenant. For instance, it may determine whether a normalized cache data object (e.g., object 204 in FIG. 6) has been generated for the requested data. This is indicated by block 312 in the flow diagram of FIG. 10. If not, then memory loading system 134 parses the data and loads it into cache store 120, as discussed above. In doing so, it can generate references to sharable objects in shared object pool 228. Loading the data into cache in this way is indicated by block 314 in the flow diagram of FIG. 10.

Once a set of normalized objects has been loaded into cache store 120, that represents the requested data, then cache sharing logic 146 retrieves any non-sharable data from the corresponding tenant cache. This is indicated by block 316. It then retrieves any inter-tenant sharable data from the shared objects pool 228. This is indicated by block 318. In one example, it does this by accessing the normalized data object (e.g., object 204) and following the inter-tenant reference/pointer in the normalized object 204 to obtain data from the identified sharable object. This is indicated by block 320. It can retrieve shared data from any inter-tenant sharable data object, in the shared objects pool 228, in other ways as well. This is indicated by block 322.

Cache sharing logic 146 then retrieves any inter-row sharable data from the shared objects in the shared objects pool 228. This is indicated by block 324 in the flow diagram of FIG. 10. This can also be done by following the inter-row reference/pointer in the normalized object in the tenant cache. This is indicated by block 326. It can be done in other ways as well, as indicated by block 328.

Other service logic 136 then generates an output, based upon the retrieved data, and returns the retrieved data, through that output, to the requesting tenant computing system. This is indicated by block 330 in the flow diagram of FIG. 10.

It can thus be seen that the present description provides a memory loading system that processes data from data stores, without changing the schema with which the data is stored in those data stores, and stores it as normalized objects in the tenant's cache store. Because the normalized objects reduce redundancy, the memory footprint for the service (or process) that is providing access to the data is greatly reduced. It is also all done in a way which is invisible to the tenant computing systems requesting access to the data.

Figure 11:
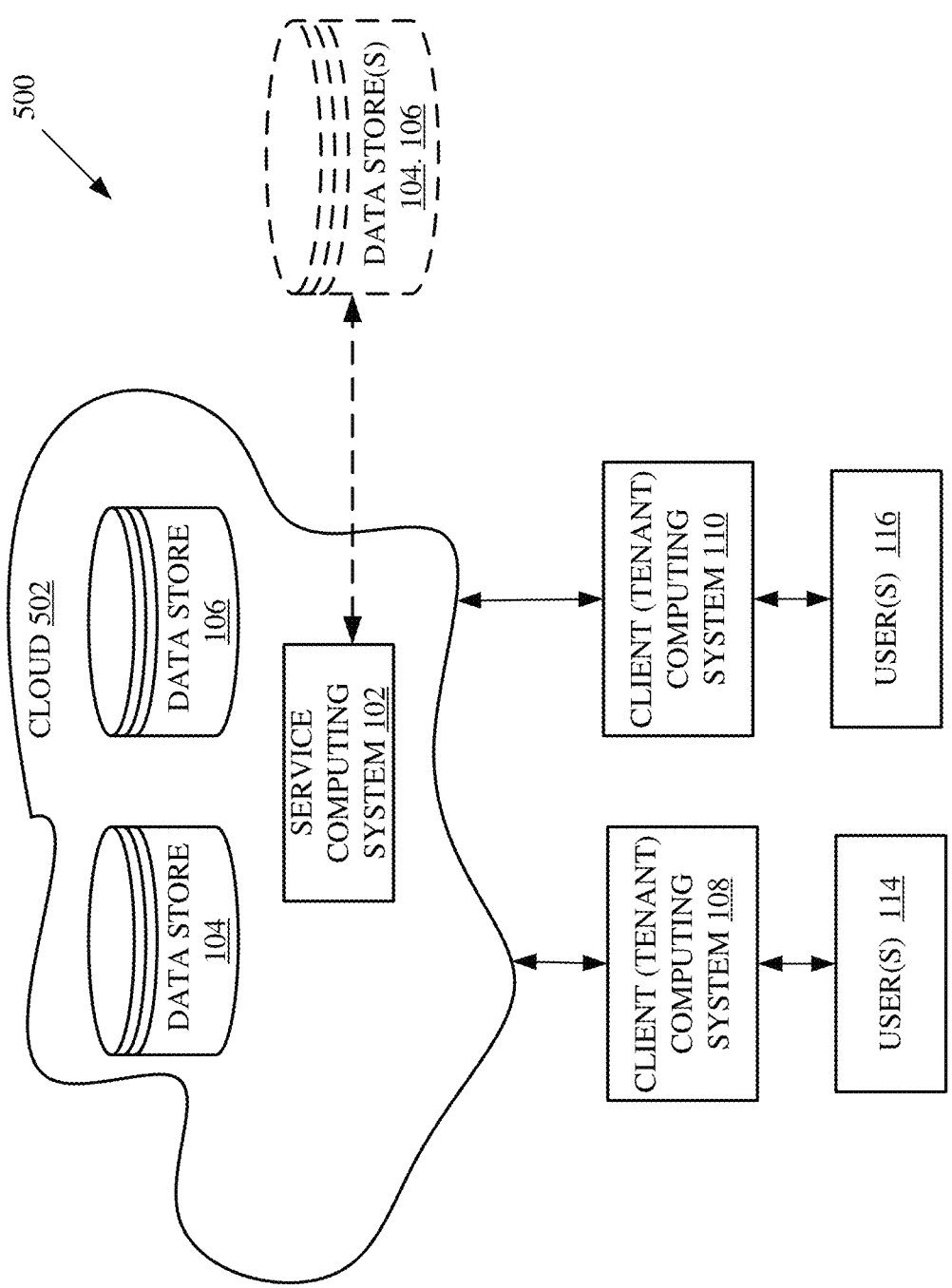
FIG. 11 is a block diagram showing one example of the architecture illustrated in FIG. 1, deployed in a cloud computing architecture.

FIG. 11 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 11, some items are similar to those shown in FIG. 1 and they are similarly numbered. FIG. 11 specifically shows that service computing system 102 can be located in cloud 502 (which can be public, private, or a combination where portions are public while others are private). Therefore, users 114 and 116 uses systems 108 and 110 to access those systems through cloud 502.

FIG. 11 also depicts another example of a cloud architecture. FIG. 11 shows that it is also contemplated that some elements of architecture 100 can be disposed in cloud 502 while others are not. By way of example, data store 104 and 106 can be disposed inside or outside of cloud 502, and accessed through cloud 502. Regardless of where they are located, they can be accessed directly by systems 108-110, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
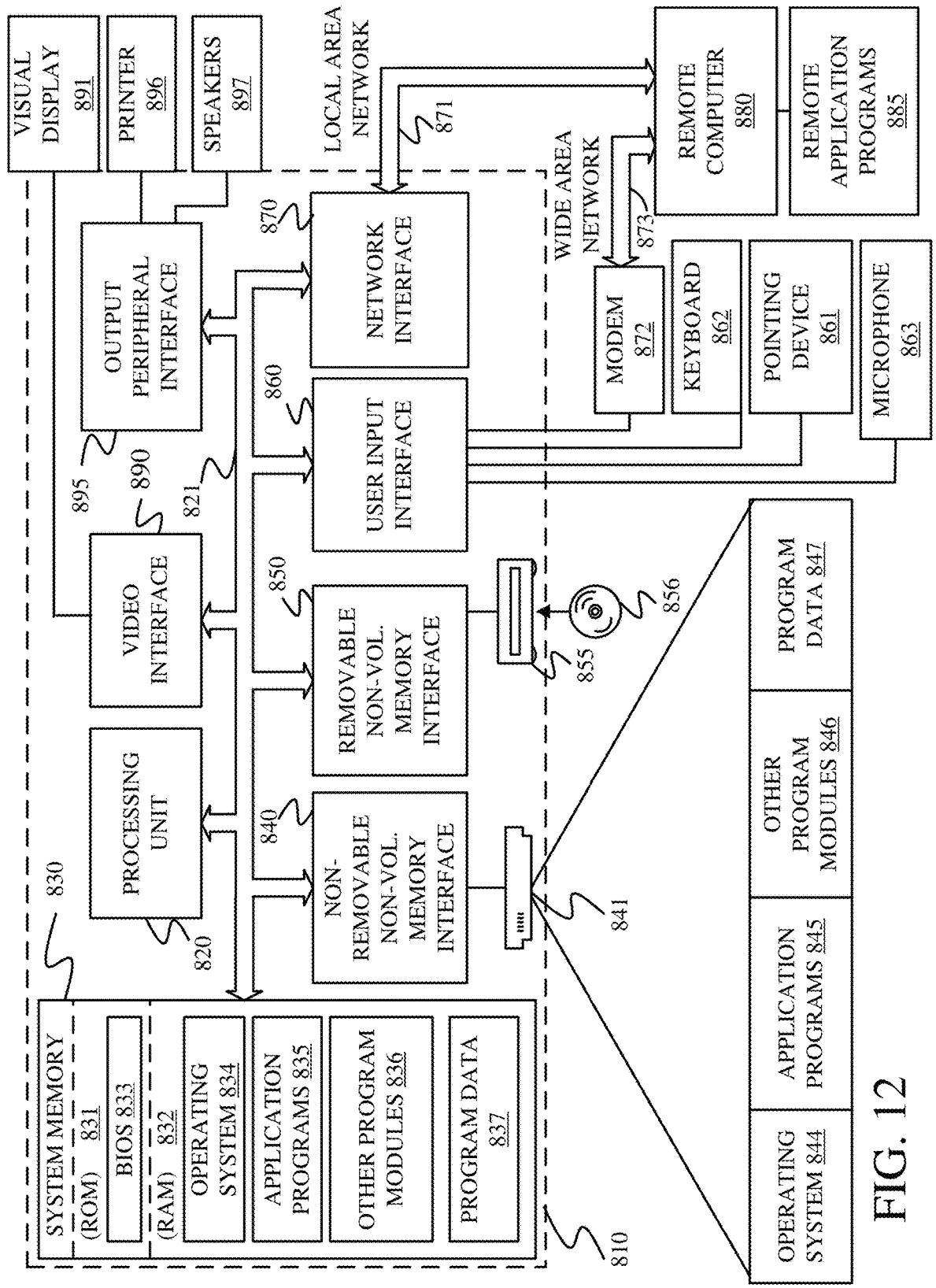
FIG. 12 is a block diagram showing one example of a computing environment that can be deployed in the architectures shown in the previous figures.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, track ball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
request processing logic that receives a data access request from a requesting computing system and identifies a data table in a database to be accessed;
data accessing logic that obtains the identified data table from the database;
parsing logic that parses the data table into a normalized cache data object, including non-sharable data properties and a reference to an inter-row sharable data object, that includes data properties that are sharable across a row of a table; and cache loading logic that loads the normalized cache data object into a cache store corresponding to the requesting computing system.

Example 2 is the computing system of any or all previous examples wherein the parsing logic is configured to parse the data table into the normalized cache data object by including a reference to an inter-tenant sharable data object, that includes inter-tenant sharable data that is sharable among a plurality of different tenant cache systems.

Example 3 is the computing system of claim 2 wherein the parsing logic comprises:
data identifier logic configured to identify a data item in the data table; and
normalized object construction logic configured to determine whether a normalized cache data object already exists in the cache and can be referred to for data in the identified data item.

Example 4 is the computing system of any or all previous examples wherein, if the normalized object construction logic determines that a normalized cache data object does not already exist in the cache store, that can be referred to for data in the identified data item, then the normalized object construction logic is configured to construct the normalized cache data object corresponding to the identified data item.

Example 5 is the computing system of any or all previous examples wherein the parsing logic further comprises:
reference generator logic configured to generate the reference to the inter-row sharable data object.

Example 6 is the computing system of any or all previous examples wherein the reference generator logic is further configured to generate the reference to the inter-tenant sharable data object.

Example 7 is the computing system of any or all previous examples wherein the normalized object construction logic is configured to identify inter-row sharable data in the identified data item and construct a first sharable object that includes the inter-row sharable data.

Example 8 is the computing system of any or all previous examples wherein the cache loading logic is configured to load the first sharable object into a shared object pool in the cache store.

Example 9 is the computing system of any or all previous examples wherein the normalized object construction logic is configured to identify inter-tenant sharable data in the identified data item and construct a second sharable object that includes the inter-tenant sharable data.

Example 10 is the computing system of any or all previous examples wherein the cache loading logic is configured to load the second sharable object into the shared object pool in the cache store.

Example 11 is the computing system of any or all previous examples and further comprising:
cache sharing logic configured to identify a normalized cache data object corresponding to a data access request and obtain non-sharable data properties from the normalized cache data object corresponding to the data access request and obtain, from the inter-row sharable data object, the inter-row sharable data, based on the reference to the inter-row sharable data object in the normalized cache data object and obtain, from the inter-tenant sharable data object, inter-tenant sharable data, based on the reference to the inter-tenant sharable data object in the normalized cache data object.

Example 12 is a computer implemented method, comprising:
identifying a data table in a database to be accessed based on a data access request from a requesting computing system;
obtaining the identified data table from the database;
parsing the data table into a normalized cache data object, including non-sharable data properties and a reference to an inter-row sharable data object, that includes data properties that are sharable across a row of a table; and
loading the normalized cache data object into a cache store corresponding to the requesting computing system.

Example 13 is the computer implemented method of any or all previous examples wherein parsing comprises:
parsing the data table into the normalized cache data object by including a reference to an inter-tenant sharable data object, that includes inter-tenant sharable data that is sharable among a plurality of different tenant cache systems.

Example 14 is the computer implemented method of any or all previous examples wherein parsing comprises:
identifying a data item in the data table; and
determining whether a normalized cache data object already exists in the cache and can be referred to for data in the identified data item.

Example 15 is the computer implemented method of any or all previous examples wherein, if it is determined that a normalized cache data object does not already exist in the cache store, that can be referred to for data in the identified data item, then constructing the normalized cache data object corresponding to the identified data item in the cache store.

Example 16 is the computer implemented method of any or all previous examples wherein parsing further comprises:
generating the reference to the inter-row sharable data object; and
generating the reference to the inter-tenant sharable data object.

Example 17 is the computer implemented method of any or all previous examples wherein constructing comprises:
identifying inter-row sharable data in the identified data item;
constructing a first sharable object that includes the inter-row sharable data; and
loading the first sharable object into a shared object pool in the cache store.

Example 18 is the computer implemented method of any or all previous examples wherein constructing comprises:
identifying inter-tenant sharable data in the identified data item;
constructing a second sharable object that includes the inter-tenant sharable data; and
loading the second sharable object into the shared object pool in the cache store.

Example 19 is the computer implemented method of any or all previous examples and further comprising:
identifying a normalized cache data object corresponding to a data access request;
obtaining non-sharable data properties from the normalized cache data object corresponding to the data access request;
obtaining, from the inter-row sharable data object, the inter-row sharable data, based on the reference to the inter-row sharable data object in the normalized cache data object; and
obtaining, from the inter-tenant sharable data object, inter-tenant sharable data, based on the reference to the inter-tenant sharable data object in the normalized cache data object.

Example 20 is a computing system, comprising:
request processing logic that receives a data access request from a requesting computing system and identifies a data table in a database to be accessed;
data accessing logic that obtains the identified data table from the database;
parsing logic that parses the data table into a normalized cache data object, including non-sharable data properties, a reference to an inter-row sharable data object, that includes data properties that are sharable across a row of a table, and a reference to an inter-tenant sharable data object, that includes inter-tenant sharable data that is sharable among a plurality of different tenant cache systems; and
cache loading logic that loads the normalized cache data object into a cache store corresponding to the requesting computing system.

Although the present invention has been described with reference to preferred embodiments, workers skilled in the art will recognize that changes may be made in form and detail without departing from the spirit and scope of the invention.

What is claimed is:

1. A computing system, comprising:
   at least one processor; and
   memory storing instructions executable by the at least one processor, wherein the instructions, when executed, cause the computing system to:
   a data access request from a requesting computing system and identify a data table in a database to be accessed;
   obtain the identified data table from the database;
   parse the data table into a normalized cache data object, including non-sharable data properties and a reference to an inter-row sharable data object, that includes data properties that are sharable across a row of a table; and
   load the normalized cache data object into a cache store corresponding to the requesting computing system.

2. The computing system of claim 1 wherein the instructions cause the computing system to parse the data table into the normalized cache data object by including a reference to an inter-tenant sharable data object, that includes inter-tenant sharable data that is sharable among a plurality of different tenant cache systems.

3. The computing system of claim 2 wherein the instructions cause the computing system to:
   identify a data item in the data table; and
   determine whether a normalized cache data object already exists in the cache and can be referred to for data in the identified data item.

4. The computing system of claim 3 wherein the instructions cause the computing system to:
   if a normalized cache data object does not already exist in the cache store, that can be referred to for data in the identified data item, then construct the normalized cache data object corresponding to the identified data item.

5. The computing system of claim 4 wherein the instructions cause the computing system to:
   generate the reference to the inter-row sharable data object.

6. The computing system of claim 5 wherein the instructions cause the computing system to generate the reference to the inter-tenant sharable data object.

7. The computing system of claim 4 wherein the instructions cause the computing system to identify inter-row sharable data in the identified data item and construct a first sharable object that includes the inter-row sharable data.

8. The computing system of claim 7 wherein the instructions cause the computing system to load the first sharable object into a shared object pool in the cache store.

9. The computing system of claim 8 wherein the instructions cause the computing system to identify inter-tenant sharable data in the identified data item and construct a second sharable object that includes the inter-tenant sharable data.

10. The computing system of claim 9 wherein the instructions cause the computing system to load the second sharable object into the shared object pool in the cache store.

11. The computing system of claim 4 wherein the instructions cause the computing system to:
    identify a normalized cache data object corresponding to a data access request and obtain non-sharable data properties from the normalized cache data object corresponding to the data access request and obtain, from the inter-row sharable data object, the inter-row sharable data, based on the reference to the inter-row sharable data object in the normalized cache data object, and
    obtain, from the inter-tenant sharable data object, inter-tenant sharable data, based on the reference to the inter-tenant sharable data object in the normalized cache data object.

12. A computer implemented method, comprising:
    identifying a data table in a database to be accessed based on a data access request from a requesting computing system;
    obtaining the identified data table from the database;
    parsing the data table into a normalized cache data object, including non-sharable data properties and a reference to an inter-row sharable data object, that includes data properties that are sharable across a row of a table; and
    loading the normalized cache data object into a cache store corresponding to the requesting computing system.

13. The computer implemented method of claim 12 wherein parsing comprises:
    parsing the data table into the normalized cache data object by including a reference to an inter-tenant sharable data object, that includes inter-tenant sharable data that is shamble among a plurality of different tenant cache systems.

14. The computer implemented method of claim 13 wherein parsing comprises:
    identifying a data item in the data table; and
    determining whether a normalized cache data object already exists in the cache and can be referred to for data in the identified data item.

15. The computer implemented method of claim 14 wherein, it is determined that a normalized cache data object does not already exist in the cache store, that can be referred to for data in the identified data item, then constructing the normalized cache data object corresponding to the identified data item in the cache store.

16. The compute implemented method of claim 15 wherein parsing further comprises:
    generating the reference to the inter-row sharable data object; and
    generating the reference to the inter-tenant sharable data object.

17. The computer implemented method of claim 15 wherein constructing comprises:

identifying inter-row sharable data in the identified data item;
constructing a first sharable object that includes the inter-row sharable data; and
loading the first sharable object into a shared object pool in the cache store.

18. The computer implemented method of claim 17 wherein constructing comprises:
identifying inter-tenant sharable data in the identified data item;
constructing a second sharable object that includes the inter-tenant sharable data; and
loading the second sharable object into the shared object pool in the cache store.

19. The computer implemented method of claim 15 and further comprising:
identifying a normalized cache data object corresponding to a data access request;
obtaining non-sharable data properties from the normalized cache data object corresponding to the data access request;
obtaining, from the inter-row sharable data object, the inter-row sharable data, based on the reference to the inter-row sharable data object in the normalized cache data object; and
obtaining, from the inter-tenant sharable data object, inter-tenant sharable data, based on the reference to the inter-tenant sharable data object in the normalized cache data object.

20. A computing system, comprising:
at least one processor; and
memory storing instructions executable by the at least one processor, wherein the instructions, when executed, cause the computing system to:
receive a data access request from a requesting computing system and identify a data table in a database to be accessed;
obtain the identified data table from the database;
parse the data table into a normalized cache data object, including non-sharable data properties, a reference to an inter-row sharable data object, that includes data properties that are sharable across a row of a table, and a reference to an inter-tenant sharable data object, that includes inter-tenant sharable data that is sharable among a plurality of different tenant cache systems; and
load the normalized cache data object into a cache store corresponding to the requesting computing system.

* * * * *